United States Patent
Kobayashi et al.

(10) Patent No.: US 8,826,753 B2
(45) Date of Patent: Sep. 9, 2014

(54) SENSOR APPARATUS WITH O-RING

(75) Inventors: Toshinari Kobayashi, Yokkaichi (JP); Kyungwoo Kim, Yokkaichi (JP); Masaharu Nakamura, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 70 days.

(21) Appl. No.: 13/528,333

(22) Filed: Jun. 20, 2012

(65) Prior Publication Data
US 2012/0326398 A1 Dec. 27, 2012

(30) Foreign Application Priority Data
Jun. 22, 2011 (JP) .................................. 2011-138557

(51) Int. Cl.
| | |
|---|---|
| *G01D 5/245* | (2006.01) |
| *G01D 11/24* | (2006.01) |
| *G01D 11/30* | (2006.01) |
| *G01D 21/00* | (2006.01) |
| *F16J 15/02* | (2006.01) |
| *F16C 33/72* | (2006.01) |
| *F16C 41/00* | (2006.01) |
| *G01D 5/14* | (2006.01) |
| *G01K 1/08* | (2006.01) |
| *G01P 3/44* | (2006.01) |
| *G01P 3/487* | (2006.01) |
| *F16C 19/18* | (2006.01) |

(52) U.S. Cl.
CPC ............ *G01D 11/245* (2013.01); *F16C 33/723* (2013.01); *F16C 41/007* (2013.01); *F16C 19/187* (2013.01); *G01D 5/145* (2013.01); *F16C 2326/02* (2013.01); *G01K 1/08* (2013.01); *G01P 3/443* (2013.01)
USPC .......................................... 73/866.5; 277/637

(58) Field of Classification Search
USPC ............................ 277/637; 73/866.5; 264/267
See application file for complete search history.

(56) References Cited

U.S. PATENT DOCUMENTS

| | | | |
|---|---|---|---|
| 2008/0204007 A1 | 8/2008 | Kim et al. | |
| 2009/0146648 A1* | 6/2009 | Iwahashi et al. | ......... 324/207.25 |
| 2010/0124665 A1 | 5/2010 | Maegawa et al. | |

FOREIGN PATENT DOCUMENTS

| | | |
|---|---|---|
| JP | A-2006-105185 | 4/2006 |
| JP | A-2008-209197 | 9/2008 |
| JP | A-2010-120245 | 6/2010 |

* cited by examiner

*Primary Examiner* — Daniel S Larkin
(74) *Attorney, Agent, or Firm* — Oliff PLC

(57) ABSTRACT

A sensor apparatus including a detecting element integrated in a case formed of a synthetic resin material, an O-ring fitted into an annular depression provided on the case, and an O-ring fitting ring member that is formed separately from the case and that is insert-molded in the case, wherein a bottom surface of the annular depression is formed by an outer peripheral surface of the O-ring fitting ring member exposed to an outer surface of the case.

18 Claims, 3 Drawing Sheets

SENSOR APPARATUS WITH O-RING

CROSS-REFERENCE TO RELATED APPLICATION

This application claims priority to JP 2011-138557 filed in Japan on Jun. 22, 2011, the disclosure of which is hereby incorporated by reference.

BACKGROUND

The present invention relates to a sensor apparatus.

Various types of sensor apparatuses have been known in the art, such as a rotation sensor that detects the rotation speed of a wheel as described in JP-A-2006-105185, or an oil temperature sensor which detects the temperature of an ATF (Automatic Transmission Fluid) as described in JP-A-2010-120245. Such sensor apparatuses, which are typically used in automotive vehicles or the like, have a structure in which detecting elements such as a magnetic detecting element or a temperature detecting element are integrated in a case formed of a synthetic resin.

SUMMARY

Typically, an outer peripheral surface of the case of such sensor apparatuses are each formed with an annular depression, and an O-ring for sealing against fluids is fitted into the annular depression. Then, when the sensor apparatus is mounted on a mounting panel portion provided on the side of an object to be detected, a gap between the sensor apparatus and the mounting cylinder portion is sealed with the O-ring, so that entry of rain water into a principal portion of the rotation sensor, and leakage of oil to the outside from the oil temperature sensor, for example, may be prevented.

However, a mold die used when molding the cases of these sensor apparatuses is divided along a parting line extending in the direction of an axis of the case, as described in JP-A-2008-209197. Thus, there is a risk of formation of a squeezed-out projection or a level difference along the parting line, which extends continuously in the direction of the axis of the case on the outer peripheral surface of the case, including the annular depression. With the interposition of such a squeezed-out projection or the level difference, a gap extending continuously in the axial direction is generated between the O-ring and the annular depression, and there is a risk of leakage of fluid through the gap.

In view of the above problem, it is an object of the invention to provide a sensor apparatus that improves a fluid sealing property in a simple structure.

According to a first embodiment of the present invention, there is provided a sensor apparatus including: a detecting element integrated in a case formed of a synthetic resin material; an O-ring fitted into an annular depression provided on the case; and an O-ring fitting ring member that is formed separately from the case and that is insert-molded in the case, wherein a bottom surface of the annular depression is formed by an outer peripheral surface of the O-ring fitting ring member exposed to an outer surface of the case.

According to the first embodiment, the bottom surface of the annular depression into which the O-ring is fitted is formed by the outer peripheral surface of the O-ring fitting ring member formed separately from the case. Accordingly, even when the squeezed-out projection or the level difference extending in the axial direction along the parting line is formed on the outer peripheral surface of the case, the squeezed-out projection or the level difference can be segmentalized by the bottom surface of the annular depression. Accordingly, the O-ring can be brought into tight contact with the bottom surface of the annular depression, and a fluid sealing property achieved by the O-ring can be improved.

Preferably, the O-ring fitting ring member is formed of a synthetic resin material and, more preferably, is formed of a synthetic resin material which is the same as that of the case in order to ensure the tight contact with respect to the case. Also, the O-ring fitting ring member may be molded by a die, which is set so that both die halves are matched in the direction corresponding to a direction of an axis of the case so as not to generate the squeezed-out projection in the direction of the axis of the case, or formed preferably by extrusion molding or by cutting a resin block or the like. However, the material of the O-ring fitting ring member is not limited to the resin material, and metallic materials may also be used.

Also, the present invention is widely applicable to various types of sensor apparatuses which may require a fluid sealing property with respect to a mounting cylinder portion on the side of an object to be detected, such as a rotation sensor that detects the speed of rotation of a wheel or the like of an automotive vehicle, or a liquid temperature sensor that detects the liquid temperature of, for example, oil or water.

In a second embodiment of the present invention, the outer peripheral surface of the O-ring fitting ring member is formed into a smooth surface over an entire circumference of the outer peripheral surface.

In the second embodiment, the bottom surface of the annular depression formed by the outer peripheral surface of the O-ring fitting ring member is formed to be a smooth surface over the entire circumference of the O-ring fitting ring member. Accordingly, the O-ring can be brought into tight contact without a gap over the entire circumference of the bottom surface of the annular depression, so that the better fluid sealing property can be obtained.

In the invention described in the first and second embodiments, a third embodiment of the present invention is configured in such a manner that an end of the O-ring fitting ring member in an axial direction disposed farther from the detecting element is formed integrally with a flange portion so as to extend outward in a direction perpendicular to the axial direction, and the flange portion is exposed to the outer surface of the case so that a side surface of the annular depression is formed by the flange portion.

According to this embodiment, not only the bottom surface of the annular depression on which the O-ring is fitted, but also the side surface thereof is formed by the O-ring fitting ring member formed separately from the case. Accordingly, generation of the squeezed-out projection or the like extending in the direction of the axis of the case in the annular depression is avoided further reliably, so that the fluid sealing property achieved by the O-ring can be improved further advantageously.

In addition, the side surface of the annular depression formed by the flange portion is a side surface located on a proximal end side away from a distal end side of the sensor apparatus on which the detecting element is provided. Therefore, when the sensor apparatus is mounted into the mounting panel portion on the side of the object to be detected, the O-ring is pressed against the side surface of the annular depression formed by the flange portion, so that the O-ring is brought into tight contact with the flange portion, and the fluid sealing property can further be improved.

In a fourth embodiment of the present invention, the O-ring fitting ring member is formed with a plurality of welded ribs to be welded to the resin material of the case on a surface opposing the resin material of the case at the time of insert-molding with the case.

In the fourth embodiment, the O-ring fitting ring member is formed with a plurality of welded ribs to be welded to the synthetic resin material of the case on a surface opposing the synthetic resin material of the case at a time of insert-molding with the case, so that a boundary between the O-ring fitting ring member and the resin material of the ease can be sealed with the welded ribs. Accordingly, the entry of fluid from between the O-ring fitting ring member and the case can be prevented.

In the present invention, a bottom surface of an annular depression into which an O-ring is fitted is formed by an outer peripheral surface of an O-ring fitting ring member formed separately from a case. Accordingly, a squeezed-out projection and a level difference extending in the direction of an axis of the case are segmentalized by the bottom surface of the annular depression, so that the bottom surface of the annular depression can be formed without the presence of the squeezed-out projection. Consequently, the O-ring can be brought into tight contact with the bottom surface of the annular depression with a simple configuration, and a better fluid sealing property is achieved. Additionally, manufacturing costs may be reduced because a specific management of a die or a process of removing the squeezed-out projection or the like becomes unnecessary.

BRIEF DESCRIPTION OF THE DRAWINGS

Various exemplary aspects of the invention will be described with reference to the drawings, wherein.

DETAILED DESCRIPTION OF EMBODIMENTS

Figure 1:
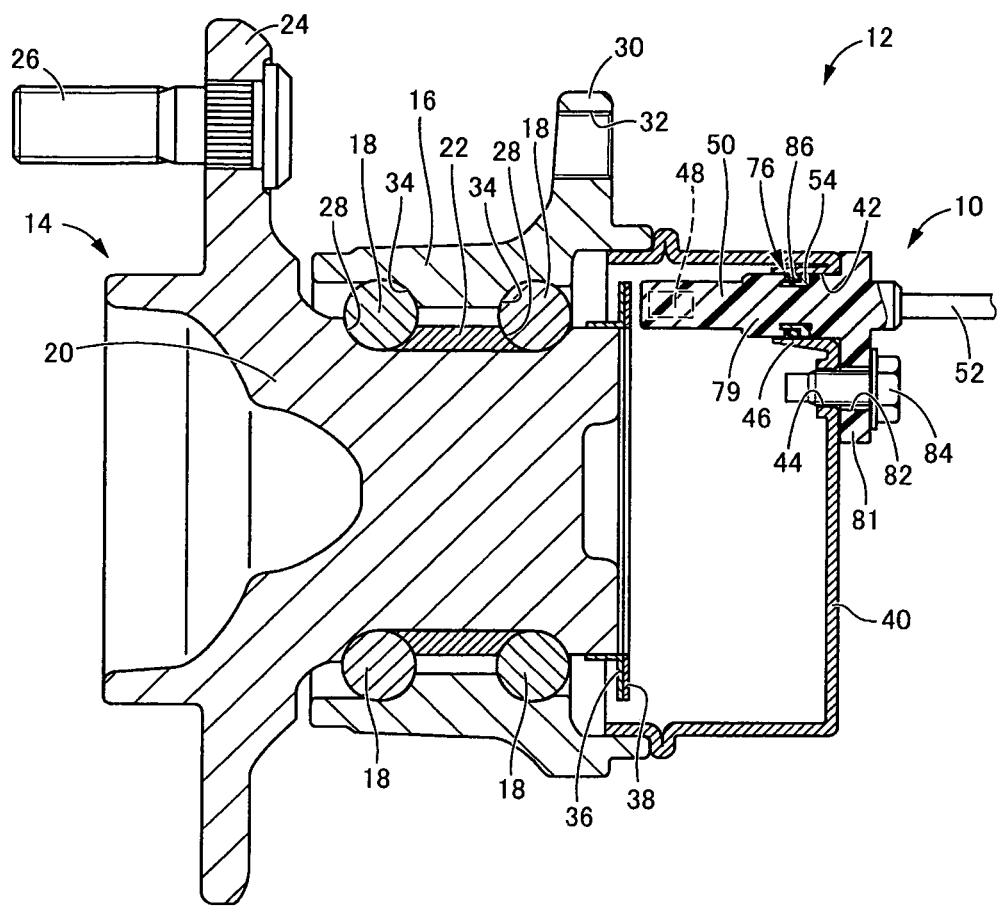
FIG. 1 is a cross-sectional view schematically showing a wheel bearing assembly provided with a sensor apparatus according to an embodiment of the present invention.

Referring now to the drawings, embodiments of the present invention will be described below.

Figure 2:
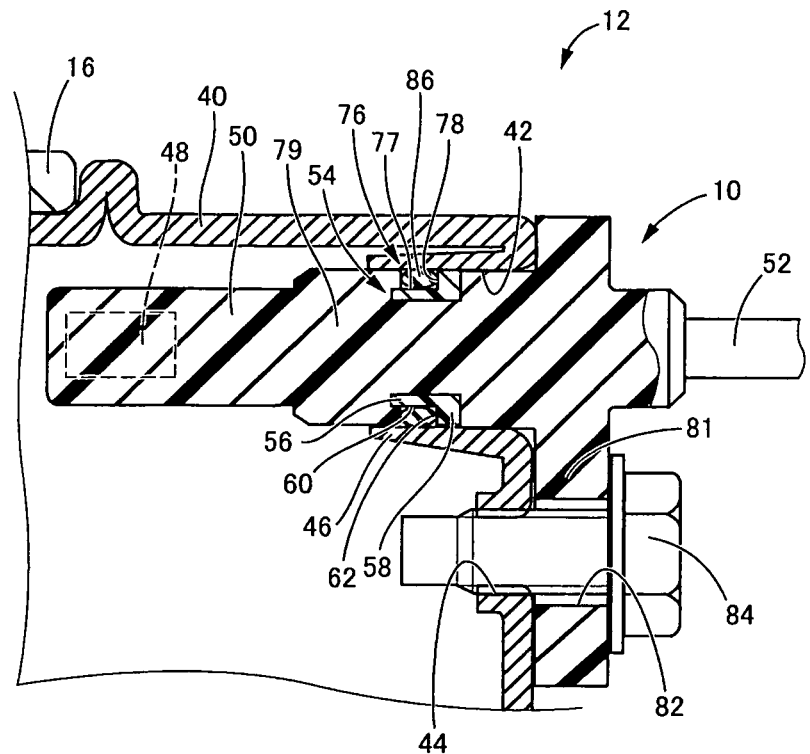
FIG. 2 is an enlarged view of a principal portion of FIG. 1.

FIG. 1 and FIG. 2 show a wheel bearing assembly 12 having a rotation sensor 10 (which is an example of a sensor apparatus) attached thereto in accordance with an embodiment of the present invention. The wheel bearing assembly 12 is known in the art as one typically used in a vehicle wheel, and hence will be described only schematically below. The wheel bearing assembly 12 includes an inner member 14, an outer member 16, and a plurality of rolling bodies 18 accommodated therebetween.

The inner member 14 includes a hub wheel 20 and a separate inner wheel 22 fixedly fitted on the hub wheel 20. The hub wheel 20 has a substantially solid rod shape, and is integrally formed with a wheel mounting flange 24 on an outer peripheral portion thereof on which a wheel, not illustrated, is to be mounted. Hub bolts 26 configured to fix the wheel are attached to the wheel mounting flange 24 equidistantly along the circumference thereof. The hub wheel 20 and the inner wheel 22 form a plurality of inner rolling surfaces 28 on an outer periphery of the inner member 14.

In contrast, the outer member 16 has a substantially cylindrical shape and is formed integrally with a vehicle body mounting flange 30 configured to be attached to a vehicle body, not illustrated, on an outer peripheral portion thereof. The outer member 16 is fixed to a vehicle body side by a bolt or the like using a bolt hole 32 provided on the vehicle body mounting flange 30. In addition, the outer member 16 is formed with a plurality of outer rolling surfaces 34 on an inner peripheral surface thereof so as to oppose the inner rolling surfaces 28 of the inner member 14.

The inner member 14 is inserted into the outer member 16, and the inner member 14 is supported so as to be rotatable with respect to the outer member 16 via the plurality of the rolling bodies 18 being capable of rolling between the outer rolling surfaces 34 and the inner rolling surfaces 28. Although not illustrated, a suitable sealing member formed of rubber or the like is provided between a wheel-side end (left end in FIG. 1) of the outer member 16 and the inner member 14 to prevent entry of rain, water or dust.

A pulsar ring 38 is mounted on the hub wheel 20 at a vehicle-body-side end (right end in FIG. 1) via a supporting fixture 36. The pulsar ring 38 is formed from a rubber magnet and has a annular plate shape. The rubber magnet may be formed by mixing ferromagnetic powder such as ferrite into, for example, an elastomer that is magnetized into N-poles and S-poles alternately in the circumferential direction. However, the pulsar ring 38 is not required to be formed into an elastomer but, for example may also be formed into a sintered metal made by hardening the ferromagnetic powder formed of ferrite or the like using a metal binder. Such a pulsar ring 38 is attached to the supporting fixture 36, and the supporting fixture 36 is fixed to the hub wheel 20 at the vehicle-body-side end, so that the pulsar ring 38 is rotated integrally with the hub wheel 20 about a center axis of the hub wheel 20.

In contrast, a cover 40 is attached to the outer member 16 at a vehicle-body-side end (right side end in FIG. 1). The cover 40 is formed into a substantially cup shape having a circular outer periphery, and an opening side thereof is fitted to the outer member 16 by being inserted therein. Accordingly, an opening of the outer member 16 on the vehicle body side (right side in FIG. 1) is covered with the cover 40. The cover 40 is formed by, for example, pressing an austenite-based stainless steel panel or an anti-corrosion processed cold rolled steel plate. The cover 40 is formed with an insertion hole 42 and a bolt insertion hole 44 penetrating therethrough on a bottom portion thereof. The insertion hole 42 is punched so that a cylindrical portion 46 projecting inward is formed by press molding.

Figure 3:
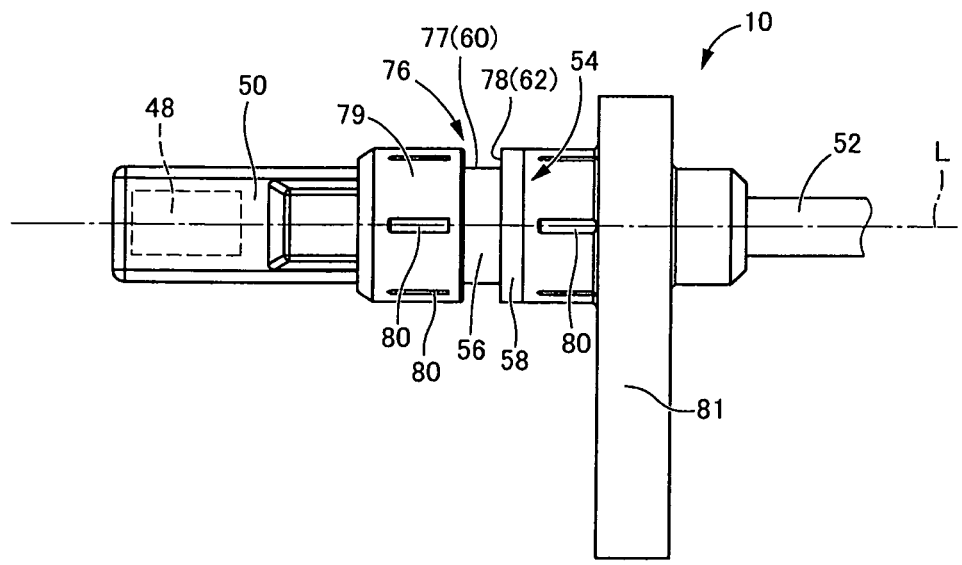
FIG. 3 is a side view of the sensor apparatus according to the embodiment of the present invention.

The rotation sensor 10 is inserted into the insertion hole 42. FIG. 3 shows the rotation sensor 10. The rotation sensor 10 is formed by insert-molding a magnetic detection IC chip 48 as a detecting element using a Hall element or a magnetic resistant element (MR element) and a control circuit, not illustrated, as needed in a case 50 formed of, for example, a synthetic resin, epoxy resin or the like. One end of an output line 52 is electrically connected to the magnetic detection IC chip 48, and the other end of the output line 52 is extended outward from the case 50 and is electrically connected to a control device such as an ECU, not illustrated.

Figure 4:
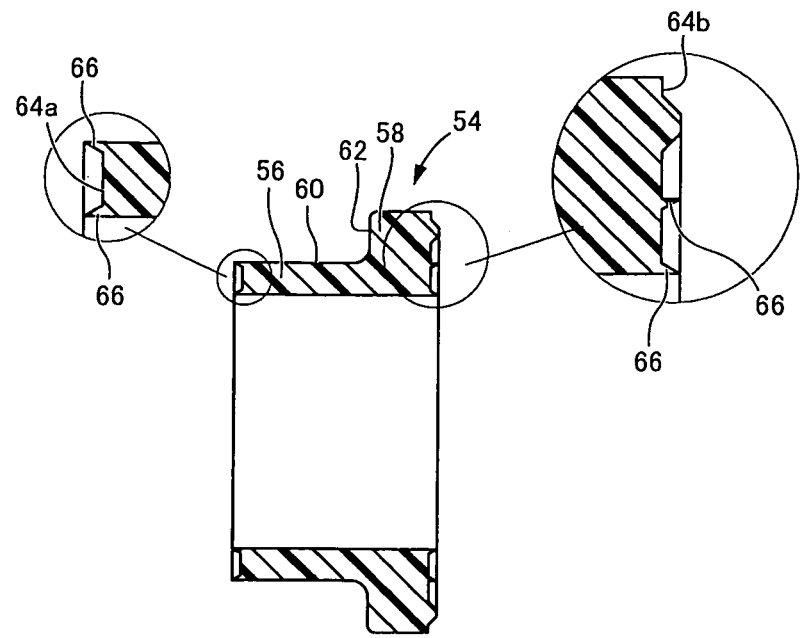
FIG. 4 is a cross-sectional view of an O-ring fitting ring member.

An O-ring fitting ring member 54 formed separately from the case 50 is insert-molded in the case 50. As shown in FIG. 4, the O-ring fitting ring member 54 is an integrally molded member including a cylindrical portion 56 and a flange portion 58 extending outward perpendicularly to an axis of the cylindrical portion 56 over an entire circumference at one end (right, in FIG. 4). An outer peripheral surface 60 of the cylindrical portion 56 and a front surface 62 of the flange portion 58 on the side of the cylindrical portion 56 are both fanned into a single smooth surface having no squeezed-out projection or level difference such as a parting line.

Both end surfaces 64a and 64b of the O-ring fitting ring member 54 in the axial direction (lateral direction in FIG. 4) are formed with a plurality of welded ribs 66. The welded ribs 66 are formed continuously with, for example, minute substantially right angled triangular cross sections or the like, that project outward in the axial direction of the O-ring fitting ring member 54, over the entire circumference of the O-ring fitting ring member 54.

Figure 5:
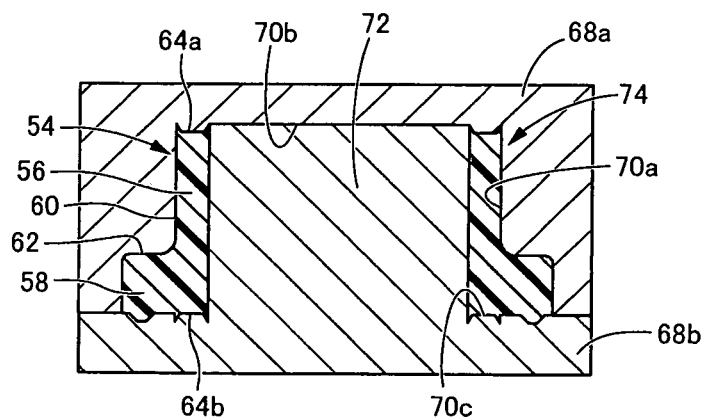
FIG. 5 is an explanatory drawing for explaining a method of molding the O-ring fitting ring member.

Such an O-ring fitting ring member 54 may be formed of a metallic material, but preferably is an integrally molded member formed of a synthetic resin material and, more preferably, is formed of the same synthetic resin material as the case 50 in order to ensure adhesion with respect to the case 50. Preferably, the O-ring fitting ring member 54 is formed by die molding using dies 68a and 68b as shown in FIG. 5. The die 68a is formed with a molding surface 70a for molding the outer peripheral surface 60 of the cylindrical portion 56 and the front surface 62 of the flange portion 58 of the O-ring fitting ring member 54, a molding surface 70b for molding one end surface 64a, and the like. In contrast, the die 68b is formed with a molding surface 70c for molding the other end surface 64b of the O-ring fitting ring member 54, a projecting portion 72 for molding a through hole of the cylindrical portion 56 by projecting toward the die 68a, and the like.

When the dies 68a and 68b are mated, a molding cavity 74 corresponding to the shape of the O-ring fitting ring member 54 is defined with respect to opposed surfaces of the molding surfaces 70a to 70c and the projecting portion 72. Then, by injecting a synthetic resin material into the molding cavity 74 through a gate, not illustrated, the O-ring fitting ring member 54 is molded. In this embodiment, a mating surface between dies 68a and 68b is set to be an identical plane to the both end surfaces 64a and 64b of the O-ring fitting ring member 54. Accordingly, the outer peripheral surface 60 of the cylindrical portion 56 and the front surface 62 of the flange portion 58 are molded by the single molding surface 70a of one of the dies 68a. Consequently, both the outer peripheral surface 60 and the front surface 62 can be molded as a single smooth surface having no squeezed-out projection or level difference, such as the parting line.

Such an O-ring fitting ring member 54 is insert-molded in the case 50 together with the magnetic detection IC chip 48 and the like. Although detailed illustration is omitted, the case 50 is molded by a plurality of matching dies divided on a center line L extending in the axial direction (lateral direction in FIG. 3) as a parting line. When performing the insert-molding into the case 50, both end surfaces 64a and 64b of the O-ring fitting ring member 54 face the resin material of the case 50, and the welded ribs 66 formed on both end surfaces 64a and 64b are fused and welded to the resin material of the case 50. Accordingly, a portion between the O-ring fitting ring member 54 and the case 50 is sealed with the welded ribs 66, and fluid can be prevented from entering the case 50 through a gap between the case 50 and the O-ring fitting ring member 54.

As shown also in FIG. 2, the O-ring fitting ring member 54 is insert-molded into the case 50 in a state in which the outer peripheral surface 60 of the cylindrical portion 56 and the front surface 62 of the flange portion 58 are exposed to the outside of the case 50. Accordingly, a groove-shaped annular depression 76 opening in the direction perpendicular to the axis and extending continuously along the entire circumference is formed on the case 50. Then, a bottom surface 77 of the annular depression 76 is formed by the outer peripheral surface 60 of the cylindrical portion 56 of the O-ring fitting ring member 54, while a side surface 78 of the annular depression 76 on the side farther from the magnetic detection IC chip 48 is formed by the front surface 62 of the flange portion 58 of the O-ring fitting ring member 54. Consequently, the bottom surface 77 and the side surface 78 of the annular depression 76 are formed into a single smooth surface formed by the outer peripheral surface 60 and the front surface 62 of the O-ring fitting ring member 54 and having no level difference.

In the case 50, both sides of the annular depression 76 correspond to a substantially column-shaped press-fitting portion 79 and are formed with the annular depression 76 at an intermediate portion of the press-fitting portion 79 in the axial direction. The press-fitting portion 79 is formed with a plurality of press-fitting ribs 80 extending in the direction of the axis of the case 50 as needed at suitable intervals, and preferably, at regular intervals in the circumferential direction of the press-fitting portion 79. The case 50 is formed integrally with a mounting panel portion 81 located on the side opposite from the magnetic detection IC chip 48 across the press-fitting portion 79 and projecting in the direction perpendicular to the axis of the case 50 (downward in FIG. 2). The mounting panel portion 81 is formed with a bolt hole 82 penetrating therethrough.

Then, as shown in FIG. 2, the case 50 of the rotation sensor 10 is inserted into the insertion hole 42 of the cover 40 from the magnetic detection IC chip 48 side, and a fixing bolt 84 is screwed into the bolt insertion hole 44 of the cover 40 through the bolt hole 82 of the mounting panel portion 81 in a state in which an O-ring 86 is fitted into the annular depression 76. Accordingly, the rotation sensor 10 is fixed to the wheel bearing assembly 12. The rotation sensor 10 is inserted at the press-fitting portion 79 into the insertion hole 42 and is inserted in the press-fitted state into the cylindrical portion 46 of the insertion hole 42 by the press-fitting ribs 80. Accordingly, when an opening of the annular depression 76 is covered by the cylindrical portion 46, the O-ring 86 is fitted into the annular depression 76 and is compressed between the bottom surface 77 of the annular depression 76 and the cylindrical portion 46. Accordingly, a gap between the cylindrical portion 46 and the case 50 is sealed by the O-ring 86 in a watertight manner, and entry of rain water or the like into the wheel bearing assembly 12 through the gap between the cylindrical portion 46 and the case 50 is prevented. The O-ring 86 is in tight contact also with the side surface 78 of the annular depression 76 formed by the front surface 62 of the O-ring fitting ring member 54.

The amount of insertion of the rotation sensor 10 is defined by the mounting panel portion 81 of the case 50 that abuts the cover 40. Accordingly, the magnetic detection IC chip 48 is positioned so as to oppose the pulsar ring 38 at a predetermined distance in the direction of the axis of the wheel bearing assembly 12. Consequently, variations in magnetic field caused by the rotation of the pulsar ring 38 are detected by the magnetic detection IC chip 48 and are converted into an electric signal, and is transmitted to the control device such as the ECU via the output line 52.

According to the rotation sensor 10 having such a structure, the bottom surface 77 of the annular depression 76 where the O-ring 86 is fitted is formed by the outer peripheral surface 60 of the O-ring fitting ring member 54 formed separately from the case 50. Accordingly, even when the squeezed-out projection or the level difference such as the parting line or the like are formed on the case 50, the squeezed-out projection or the level difference can be segmentalized by the bottom surface 77 of the annular depression 76 because the O-ring fitting ring member 54 is formed separately from the case 50. Accordingly, the O-ring 86 can be brought into tight contact with the bottom surface 77 of the annular depression 76 with a simple configuration, and a better fluid sealing property is achieved. In particular, in this embodiment, the outer peripheral surface 60 of the O-ring fitting ring member 54, which forms the bottom surface 77 of the annular depression 76, is molded by the single molding surface 70a of the die 68a. Accordingly, the outer peripheral surface 60 can be formed into a single smooth surface having no level difference such as the parting line or squeezed-out projection. Consequently, the bottom surface 77 of the annular depression 76 is formed into a flat smooth surface over the entire circumference and hence the O-ring 86 can be brought into a tighter contact therewith, so that a better fluid sealing property can be obtained.

In addition, one of the side surfaces 78 of the annular depression 76, which is located behind in the direction of insertion into the cover 40 (from right to left in FIG. 2) and is subject to pressure from the O-ring 86 when the rotation sensor 10 is inserted into the cover 40, is formed by the O-ring fitting ring member 54 which is a separate member from the case 50. Accordingly, the side surface 78 of the annular depression 76 can also be formed without forming the squeezed-out projection or the level difference extending in the direction of the axis of the case 50. Consequently, the O-ring 86 can be brought into a tighter contact also with the side surface 78, so that a better fluid sealing property can be obtained.

Although the embodiments of the present invention have been described thus far, the present invention is not limited by the detailed description. For example, in the embodiment described above, the flange portion 58 of the O-ring fitting ring member 54 is not necessarily needed, and a configuration in which only the outer peripheral surface 60 of the cylindrical portion 56 is exposed to the outside of the case 50, and only the bottom surface 77 of the annular depression 76 is formed by the O-ring fitting ring member 54 is also applicable.

Also, the material of the O-ring fitting ring member is not limited to the synthetic resin, and metallic materials may also be used. In addition, the method of molding the O-ring fitting ring member is not limited to the die molding, and it may be formed by cutting a block member formed of a synthetic resin or a metal, or by pressing a metallic plate.

Furthermore, the present invention is not limited to a rotation sensor as described in the embodiment shown above, and may be applied to, for example, oil temperature sensors having a thermistor integrated in the case as the detecting element, which are configured to detect the temperature of ATF (Automatic Transmission Fluid) in automotive vehicles or, as other sensors except for those to be provided on the vehicles, to various types of sensor apparatuses which require the fluid sealing property in the mounted state.

What is claimed is:

1. A sensor apparatus comprising:
   a detecting element integrated in a case fowled of a synthetic resin material;
   an O-ring fitted into an annular depression provided on the case; and
   an O-ring fitting ring member that is formed separately from the case and that is insert-molded in the case, wherein a bottom surface of the annular depression is formed by an outer peripheral surface of the O-ring fitting ring member exposed to an outer surface of the case.

2. The sensor apparatus according to claim 1, wherein the outer peripheral surface of the O-ring fitting ring member is formed into a smooth surface over an entire circumference of the outer peripheral surface.

3. The sensor apparatus according to claim 2, wherein the O-ring fitting ring member is formed with a plurality of welded ribs to be welded to the synthetic resin material of the case on a surface opposing the synthetic resin material of the case at a time of insert-molding with the case.

4. The sensor apparatus according to claim 3, wherein the plurality of welded ribs are formed with triangular cross-sections.

5. The sensor apparatus according to claim 2, wherein the O-ring fitting ring member is formed of a synthetic resin material or a metallic material.

6. The sensor apparatus according to claim 2, wherein the O-ring fitting ring member is formed from the synthetic resin material used to form the ease.

7. The sensor apparatus according to claim 1, wherein an end of the O-ring fitting ring member in an axial direction disposed farther from the detecting element is formed integrally with a flange portion so as to extend outward in a direction perpendicular to the axial direction, and the flange portion is exposed to the outer surface of the case so that a side surface of the annular depression is formed by the flange portion.

8. The sensor apparatus according to claim 7, wherein the outer peripheral surface of the O-ring fitting ring member is formed into a smooth surface over an entire circumference of the outer peripheral surface.

9. The sensor apparatus according to claim 8, wherein the O-ring fitting ring member is formed with a plurality of welded ribs to be welded to the synthetic resin material of the case on a surface opposing the synthetic resin material of the case at a time of insert-molding with the case.

10. The sensor apparatus according to claim 9, wherein the plurality of welded ribs are formed with triangular cross-sections.

11. The sensor apparatus according to claim 8, wherein the O-ring fitting ring member is formed of a synthetic resin material or a metallic material.

12. The sensor apparatus according to claim 8, wherein the O-ring fitting ring member is formed of a synthetic resin material used to form the case.

13. The sensor apparatus according to claim 7, wherein the O-ring fitting ring member is formed with a plurality of welded ribs to be welded to the synthetic resin material of the case on a surface opposing the synthetic resin material of the case at a time of insert-molding with the case.

14. The sensor apparatus according to claim 13, wherein the plurality of welded ribs are formed with triangular cross-sections.

15. The sensor apparatus according to claim 1, wherein the O-ring fitting ring member is formed with a plurality of welded ribs to be welded to the synthetic resin material of the case on a surface opposing the synthetic resin material of the case at a time of insert-molding with the case.

16. The sensor apparatus according to claim 15, wherein the plurality of welded ribs are formed with triangular cross-sections.

17. The sensor apparatus according to claim 15, wherein the plurality of welded ribs are located at both ends of the O-ring fitting ring member in an axial direction.

18. A sensor apparatus comprising:
   a detecting element integrated in a case formed of a synthetic resin material;

an O-ring fitted into an annular depression provided on the ease; and an O-ring fitting ring member that is formed separately from the case and that is insert-molded in the case, wherein the O-ring fitting ring member is located at a position radially inside of the O-ring.

\* \* \* \* \*